US012728510B2

(12) United States Patent
Flamm et al.

(10) Patent No.: US 12,728,510 B2
(45) Date of Patent: Sep. 8, 2026

(54) FASTENER CAP DRIVING TOOL WITH SELF-REVERSING LEAD SCREW CAP FEEDER

(71) Applicant: Kyocera Senco Industrial Tools, Inc., Cincinnati, OH (US)

(72) Inventors: Braedon S. Flamm, Liberty Township, OH (US); Alexander D. Green, Cincinnati, OH (US); William D. Rice, West Chester, OH (US)

(73) Assignee: Kyocera Senco Industrial Tools, Inc., Cincinnati, OH (US)

( * ) Notice: Subject to any disclaimer, the term of this patent is extended or adjusted under 35 U.S.C. 154(b) by 0 days.

(21) Appl. No.: 19/175,016

(22) Filed: Apr. 10, 2025

(65) Prior Publication Data

US 2025/0319579 A1 Oct. 16, 2025

Related U.S. Application Data

(60) Provisional application No. 63/633,675, filed on Apr. 12, 2024.

(51) Int. Cl.
*B25C 5/13* (2006.01)
*B25C 1/00* (2006.01)
(Continued)

(52) U.S. Cl.
CPC ............ *B25C 5/1693* (2013.01); *B25C 1/003* (2013.01); *B25C 1/047* (2013.01); *B25C 1/06* (2013.01);
(Continued)

(58) Field of Classification Search
CPC .. B25C 7/00; B25C 1/06; B25C 1/047; B25C 1/003; B25C 1/006; B25C 1/008;
(Continued)

(56) References Cited

U.S. PATENT DOCUMENTS 2,930,043 A * 3/1960 Bolling .................. B25C 1/001 227/115
3,123,925 A * 3/1964 Johnson ............... G03B 23/046 353/116
(Continued)

FOREIGN PATENT DOCUMENTS

CN 2750897 1/2006
CN 10369990 3/2014
(Continued)

OTHER PUBLICATIONS

PCT Int'l Search Report, mailed Jun. 9, 2025, PCT/US2025/023991, 12 pgs.

*Primary Examiner* — Joshua G Kotis
(74) *Attorney, Agent, or Firm* — Frederick H. Gribbell; Russell F. Gribbell; William E. Crouse

(57) ABSTRACT

A fastener cap driving tool with a pressurized gas storage chamber that uses that pressurized gas as a gas spring to quickly force a piston and a driver into contact with a fastener. The pressurized gas is not vented to atmosphere, but is instead reused, and a motor powers a lifter to return the piston and the driver for the next driving stroke. The tool has a fastener magazine, and a separate cap magazine which includes an additional motor that powers a self-reversing lead screw. The lead screw acts as a feed pawl, and advances a collated strip of caps from the cap magazine towards an exit end of the tool. During a driving stroke, one fastener is driven through one cap, securing both to a workpiece.

27 Claims, 12 Drawing Sheets

(51) Int. Cl.
*B25C 1/04* (2006.01)
*B25C 1/06* (2006.01)
*B25C 5/15* (2006.01)
*B25C 5/16* (2006.01)

(52) U.S. Cl.
CPC .................. *B25C 5/13* (2013.01); *B25C 5/15* (2013.01); *B25C 1/008* (2013.01)

(58) Field of Classification Search
CPC ........... B25C 5/1693; B25C 5/13; B25C 5/15; B25B 23/045
See application file for complete search history.

(56) References Cited

U.S. PATENT DOCUMENTS 3,595,460 A 7/1971 Pitkin
3,854,648 A * 12/1974 Inzoli ...................... B25C 1/003 227/136
3,982,678 A * 9/1976 Olson ..................... B25C 1/003 227/63
5,634,583 A 6/1997 McGuinness
5,791,546 A 8/1998 McGuinness
5,947,362 A * 9/1999 Omli ..................... B25C 5/1693 227/120
6,065,660 A 5/2000 Cabrera
6,145,725 A 11/2000 Omli
6,302,310 B1 10/2001 Lamb
6,478,209 B1 11/2002 Bruins
6,508,392 B1 1/2003 Huang
6,543,666 B1 4/2003 Huang
6,736,303 B2 5/2004 Bruins
6,779,700 B2 8/2004 Bruins
6,820,789 B2 11/2004 Lipsky
6,908,022 B2 6/2005 Schmitz
6,966,389 B1 11/2005 Riggs
6,968,945 B2 11/2005 Bruins
7,025,241 B2 4/2006 Castellanos
7,090,455 B2 8/2006 Lamb
7,140,525 B2 11/2006 Ho
7,232,050 B2 6/2007 Omli
7,344,058 B2 3/2008 Bruins
7,481,346 B2 1/2009 Vanden Berg
8,206,316 B2 * 6/2012 Hibner ............... A61B 10/0096 600/567
8,251,273 B2 8/2012 Shor
8,413,740 B2 4/2013 Rodenhouse
10,717,634 B2 * 7/2020 Hall ......................... B66D 1/50
10,960,525 B2 3/2021 Vandenberg
2003/0015565 A1 * 1/2003 Lee ....................... B25C 5/1693 227/18
2003/0057248 A1 * 3/2003 Bruins .................... B25C 1/003 227/18
2003/0102350 A1 6/2003 Liu
2008/0017685 A1 1/2008 Buck
2008/0017686 A1 1/2008 Buck
2008/0017687 A1 1/2008 Buck
2013/0193188 A1 * 8/2013 Shelton, IV ..... A61B 17/07207 227/175.2
2014/0138422 A1 5/2014 Ronconi
2015/0306754 A1 10/2015 Pappin
2019/0314967 A1 * 10/2019 Garces .................... B25C 1/047
2020/0306941 A1 * 10/2020 Akiba ....................... B25C 1/04
2021/0178562 A1 6/2021 Vandenberg
2021/0347022 A1 * 11/2021 Leathrum ............... B25C 1/003
2022/0063075 A1 3/2022 Carrier et al.
2023/0137720 A1 * 5/2023 Aizawa ................... B25C 1/047 227/129
2024/0238955 A1 * 7/2024 Hirooka .................. B25C 1/047
2024/0408729 A1 * 12/2024 Wang ........................ B25C 5/15
2025/0025994 A1 * 1/2025 Sutherland .............. B25C 1/041
2025/0050484 A1 * 2/2025 Wang .................... B25C 5/1693
2025/0083291 A1 * 3/2025 Hegarty ................ B25C 5/1627
2025/0187163 A1 * 6/2025 Yoshikane .............. B25F 5/008
2025/0187164 A1 * 6/2025 Yoshikane ................ B25C 1/06

FOREIGN PATENT DOCUMENTS

| | | |
|---|---|---|
| CN | 103707265 | 4/2014 |
| CN | 215318486 | 12/2021 |
| DE | 2235551 | 1/1974 |
| DE | 2240233 | 2/1974 |
| JP | 2006150546 | 6/2006 |
| WO | 9939878 | 8/1999 |

* cited by examiner

FASTENER CAP DRIVING TOOL WITH SELF-REVERSING LEAD SCREW CAP FEEDER

CROSS-REFERENCE TO RELATED APPLICATIONS

The present application claims priority to provisional patent application Ser. No. 63/633,675, titled "FASTENER CAP DRIVING TOOL WITH SELF-REVERSING LEAD SCREW CAP FEEDER," filed on Apr. 12, 2024.

TECHNICAL FIELD

The technology disclosed herein relates generally to fastener driving tools and is particularly directed to driving tools that sequentially force both a fastener and a cap to adhere onto a workpiece. At least one embodiment is disclosed as a fastener cap driving tool that has a main chamber that stores and reuses pressurized gas, the pressurized gas acts as a gas spring on a piston and a driver, a battery, a second motor that powers a lifter, a first magazine, a second magazine which includes a first motor that powers a self-reversing lead screw, and the lead screw sequentially advances a collated strip of caps.

The lead screw exhibits a plurality of grooves around its outer circumference, and a follower seats in the grooves. When the first motor is energized, the lead screw rotates, which forces the follower to move forward within the path of the grooves. The follower is mounted on a feed pawl, which contacts a lead cap on the collated strip of caps, and advances the collated strip forward. As the lead screw continues rotating, the grooves force the follower and the feed pawl backwards in order to contact the next cap on the collated strip. As the lead screw continues rotating, the follower and the feed pawl will linearly move back and forth along the grooves, feeding one cap at a time towards the front end of the tool.

A sensor may be placed proximal to the feed pawl in order to detect the position of the feed pawl. The sensor communicates with a controller in or on the tool, and when the feed pawl is detected the controller will determine that either a cap is ready to be advanced or has finished advancing. Alternatively, the sensor may be configured to work in the opposite manner as well.

STATEMENT REGARDING FEDERALLY SPONSORED RESEARCH OR DEVELOPMENT

None.

BACKGROUND

Fastener cap driving tools are commonly used in roofing applications, house wrap, and lumber tagging. Securing a cap along with the fastener better secures the roofing material, and provides some protection from the elements (such as rain), as specified in the International Building Code ("IBC") 2021, section 1507. A common problem with these types of tools is that an external source of pressurized gas is required in order to operate the tool. A user needs to attach a hose to an external gas compressor, and the compressor must be connected to an external power source. This limits the maneuverability of both the tool and the user, since the compressor needs to be moved around the roof in proximity to the tool, or a long cumbersome hose must be traversed back to the compressor.

SUMMARY

Accordingly, it is an advantage to provide a hoseless fastener cap driving tool, in which a main chamber stores pressurized gas to be used as a gas spring during a driving stroke, a battery that energizes a first motor, and the first motor rotates a self-reversing lead screw that sequentially advances a collated strip of caps.

It is another advantage to provide a cap feed pawl assembly for a hoseless fastener cap driving tool, in which the assembly includes a first motor, a self-reversing lead screw exhibiting a plurality of grooves around the outer circumference of the lead screw, and a follower that seats in the grooves and is mounted to a feed pawl, such that when the first motor is energized the lead screw rotates and forces the follower and the feed pawl to move along the grooves in a back and forth motion.

It is yet another advantage to provide a cap feed pawl assembly with a sensor for a hoseless fastener cap driving tool, in which the assembly includes a first motor, a self-reversing lead screw exhibiting a plurality of grooves around the outer circumference of the lead screw, a follower that seats in the grooves and is mounted to the feed pawl, and the sensor is mounted proximal to the lead screw, such that when the feed pawl is in motion, the sensor can detect the feed pawl and send a signal to a controller mounted on the tool.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a fastener cap driving tool is provided, which comprises: an outer housing; a working cylinder that includes a movable piston therewithin, and a driver in mechanical communication with the movable piston; a storage chamber that is in fluidic communication with the working cylinder, the storage chamber being charged with a pressurized gas, and the pressurized gas causing the movable piston and the driver to move through a driving stroke toward a driven position, wherein the pressurized gas is not vented to atmosphere after the driving stroke, but instead the pressurized gas is re-used for a plurality of operating cycles; a first magazine for feeding a collated strip of fasteners; a second, separate magazine for feeding a collated strip of caps; a removably attachable battery; and a cap feeder sub-assembly, which comprises: a self-reversing lead screw; a feed pawl; and a first motor in mechanical communication with the self-reversing lead screw; and when a driving stroke occurs, one fastener from the collated strip of fasteners pierces one cap from the collated strip of caps, thereby adhering one fastener and one cap to a surface.

In accordance with another aspect, a cap feeder for a fastener cap driving tool is provided, the cap feeder which comprises: a self-reversing lead screw; a feed pawl; a first motor in mechanical communication with the self-reversing lead screw; a guide exhibiting a pivot point and an opening; a spring; a mounting bracket; the first motor is attached to a first side of the mounting bracket, and the self-reversing lead-screw is attached to an opposite second side of the mounting bracket; the mounting bracket is attached to the guide proximal to the pivot point; and the spring biases the feed pawl into engagement with a collated strip of caps.

In accordance with yet another aspect, a fastener cap driving tool is provided, which comprises: an outer housing; a controller; a working cylinder that includes a movable piston therewithin, and a driver in mechanical communication with the movable piston; a handle portion including a trigger; a storage chamber that is in fluidic communication with the working cylinder, the storage chamber being charged with a pressurized gas, and the pressurized gas causing the movable piston and the driver to move through a driving stroke toward a driven position, wherein the pressurized gas is not vented to atmosphere after the driving stroke, but instead the pressurized gas is re-used for a plurality of operating cycles; a first magazine for feeding a collated strip of fasteners; a second, separate magazine for feeding a collated strip of caps; a removably attachable battery; and a cap feeder sub-assembly, which comprises: a self-reversing lead screw; a feed pawl; a first motor in mechanical communication with the self-reversing lead screw; a mounting bracket including a sensor; and when a driving stroke occurs, one fastener from the collated strip of fasteners pierces one cap from the collated strip of caps, thereby adhering one fastener and one cap to a surface.

In accordance with a yet further aspect, a method for driving a fastener and a cap onto a surface is provided, in which the method comprises: providing a fastener cap driving tool that includes: an outer housing; a working cylinder that includes a movable piston therewithin, and a driver in mechanical communication with the movable piston; a storage chamber that is in fluidic communication with the working cylinder, the storage chamber being charged with a pressurized gas, and the pressurized gas causing the movable piston and the driver to move through a driving stroke toward a driven position, wherein the pressurized gas is not vented to atmosphere after the driving stroke, but instead the pressurized gas is re-used for a plurality of operating cycles; a first magazine for feeding a collated strip of fasteners; a second, separate magazine for feeding a collated strip of caps; a removably attachable battery; and a cap feeder sub-assembly, which comprises: a self-reversing lead screw; a feed pawl; and a first motor in mechanical communication with the self-reversing lead screw; and initiating a driving stroke, wherein one fastener from the collated strip of fasteners pierces one cap from the collated cap of strips, thereby adhering one fastener and one cap to a surface.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
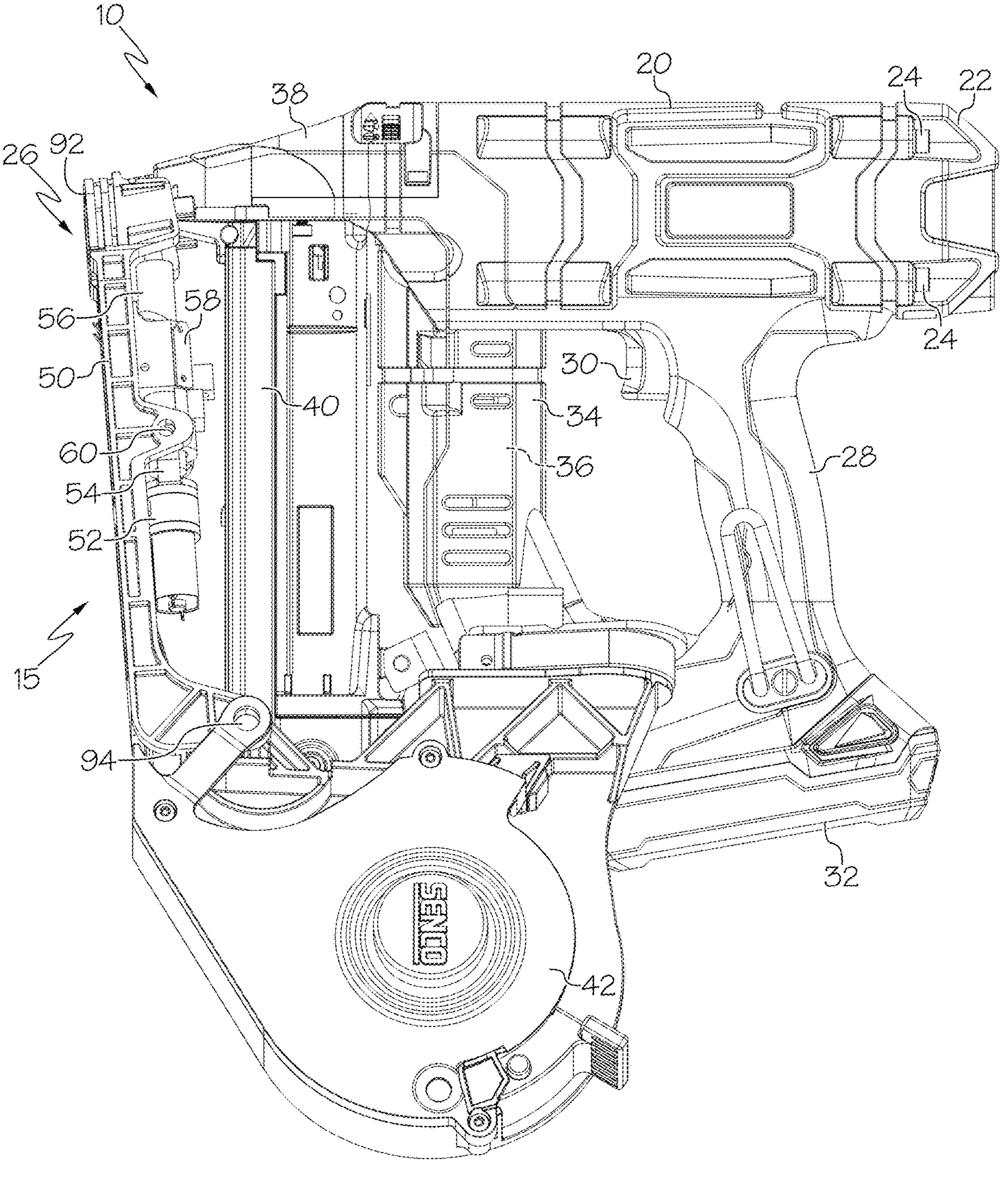
FIG. 1 is a left-side elevational view of the major components of a fastener cap driving tool, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms "connected" or "coupled" and variations thereof are not restricted to physical or mechanical connections or couplings. Furthermore, the terms "communicating with" or "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. If a product has moving parts that rely on magnetic fields, or somehow detects a change in a magnetic field, or if data is passed from one electronic device to another by use of a magnetic field, then one could refer to those situations as items that are "in magnetic communication with" each other, in which one end of the "communication" may induce a magnetic field, and the other end may receive that magnetic field, and be acted on (or otherwise affected) by that magnetic field.

The terms "first" or "second" preceding an element name, e.g., first inlet, second inlet, etc., are used for identification purposes to distinguish between similar or related elements, results or concepts, and are not intended to necessarily imply order, nor are the terms "first" or "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein. Furthermore, if software is utilized, then the processing circuit that executes such software can be of a general purpose computer, while fulfilling all the functions that otherwise might be executed by a special purpose computer that could be designed for specifically implementing this technology.

It will be understood that the term "circuit" as used herein can represent an actual electronic circuit, such as an integrated circuit chip (or a portion thereof), or it can represent a function that is performed by a processing circuit, such as a microprocessor or an ASIC that includes a logic state machine or another form of processing element (including a sequential processing circuit). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

Referring now to FIG. 1, a fastener cap driving tool is generally designated by the reference numeral 10. The tool 10 includes an outer housing 20, an end cap 22 secured to the tool by a plurality of fasteners 24, a guide body 38, an exit end 26, and a handle portion 28. The tool also includes a user-operated trigger 30, a motor housing 34 having a second motor 36 therewithin (see FIG. 3), a removable battery 32, a fastener magazine 40, a cap magazine 42, and a cap feeder sub-assembly ("S/A") 15.

The cap feeder S/A 15 includes a guide 50 (also sometimes referred to herein as a "rail"), a first motor 52, a mounting bracket 54, a lead screw 56 (also sometimes referred to herein as a "self-reversing lead screw"), and a feed pawl 58. The cap feeder S/A also includes a pivot point 60, a spring 62 (preferably a leaf spring), a follower 46 mounted on the feed pawl, a plurality of grooves 66 on an outer circumference of the lead screw, an opening 82 in the feed pawl that mounts over the lead screw, a cap contact portion 68, and an opening 48 in the rail proximal to the exit end 26 of the tool 10 (see FIG. 9). The first motor 52 is in mechanical communication with the lead screw 56.

The cap feeder S/A 15 exhibits a safety contact portion 92 (also sometimes referred to herein as a "first end"), which mounts over the exit end 26 of the tool 10. A second end 94 (sometimes referred to herein as a "pivoting point") of the cap feeder S/A 15 is mounted to the cap magazine 42. During a driving stroke, a user presses the front end 92 onto a surface, which forces the cap feeder S/A 15 to pivot at the second end 94, and the cap feeder S/A 15 moves in a direction towards the handle portion 28. When the driving stroke is finished, the user pulls the first end 92 out of contact and away from the surface, and the cap feeder S/A 15 pivots at the second end 94 back towards its original position.

Figure 2:
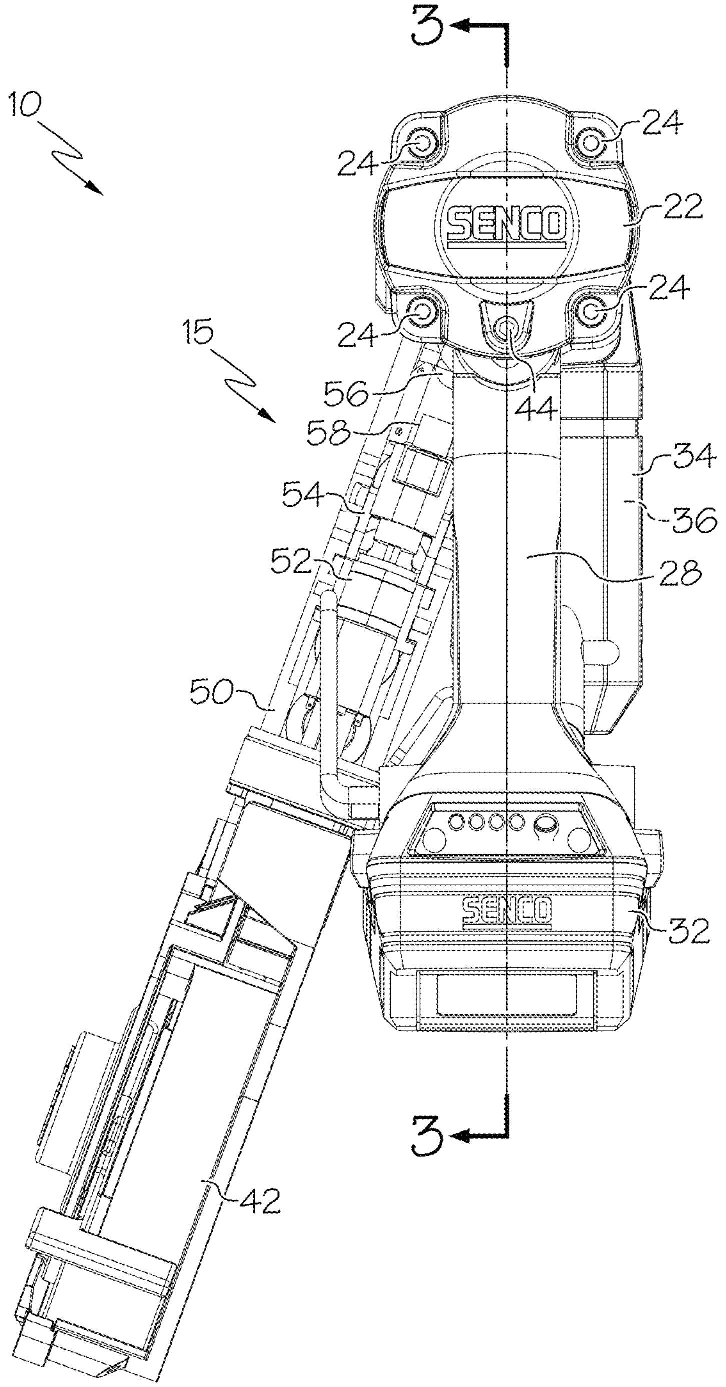
FIG. 2 is a top elevational view of the tool of FIG. 1.

Referring now to FIG. 2, a fill valve 44 is depicted on the end cap 22. The cap feeder S/A 15 and the cap magazine 42 are mounted at an angle to the tool 10, whereas the fastener magazine 40 is mounted in-line with the handle portion 28. The motor housing 34 is mounted on the opposite side of the tool from the cap feeder S/A.

Figure 3:
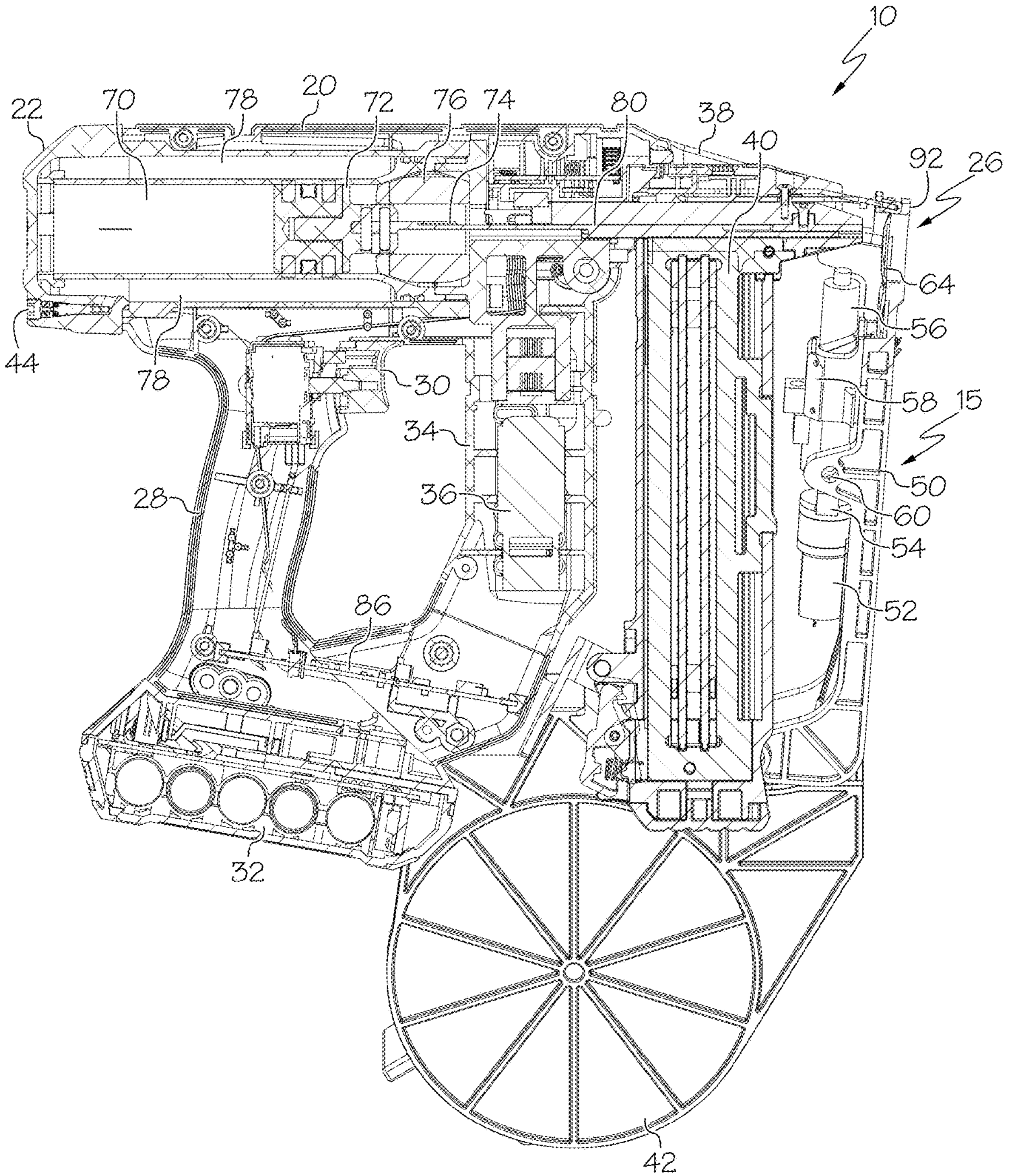
FIG. 3 is a right-side cutaway view along the line 3-3 of the tool of FIG. 2.

Referring now to FIG. 3, some of the inner mechanisms of the tool 10 are depicted, such as a working cylinder 70, which includes a movable piston 72 and a driver 74, a piston stop 76, and a storage chamber 78 that stores and reuses pressurized gas. FIG. 3 depicts the movable piston 72 and driver 74 near the end of a "driving stroke." A rotary-to-linear lifter 84 (see FIG. 10) contacts the driver 74 and forces it and the piston back towards the end cap 22, and then the lifter holds the piston and driver at a "ready position." Alternatively, a latch (not shown in FIG. 3) could be used to hold the piston and the driver at the ready position, or both the latch and the lifter could be used.

The storage chamber 78 is in fluidic communication with the working cylinder 70 and is charged with a pressurized gas. In a driving stroke, the piston 72 and driver 74 are released, and the pressurized gas quickly forces the piston and driver towards the exit end 26 of the tool 10. In other words, the pressurized gas acts as a gas spring during the driving stroke of the tool. During the driving stroke, the driver 74 travels through an opening in the piston stop 76, then through a driver track 80 where the driver contacts and pushes a fastener towards a cap, then pushes the fastener onto the cap and out of both the exit end 26 and the opening 48, and lastly into a workpiece. The pressurized gas is not vented to atmosphere, but is contained within the working cylinder 70, and the pressurized gas will be reused during the subsequent driving strokes.

The cap magazine 42 holds a collated strip of caps 64, and the collated strip of caps are then fed to the cap feeder S/A 15. Each driving stroke drives one fastener into one cap and onto a workpiece (i.e., the fastener pierces the cap and adheres both to the surface). The fastener magazine 40 is typically loaded with a collated strip of fasteners, such as a nails or staples, to be used in securing each cap to a workpiece. A controller 86 is typically mounted on a printed circuit board ("PCB") inside the tool 10, proximal to the battery 32. The battery energizes the controller, the second motor 36, and the first motor 52. The second motor 36 powers the lifter 84 during a "return stroke," when the lifter is forcing the piston 72 and driver 74 back to the ready position.

FIGS. 4-8 depict the cap feeder S/A 15 sequentially advancing the collated strip of caps 64 during operation of the tool 10.

Figure 4:
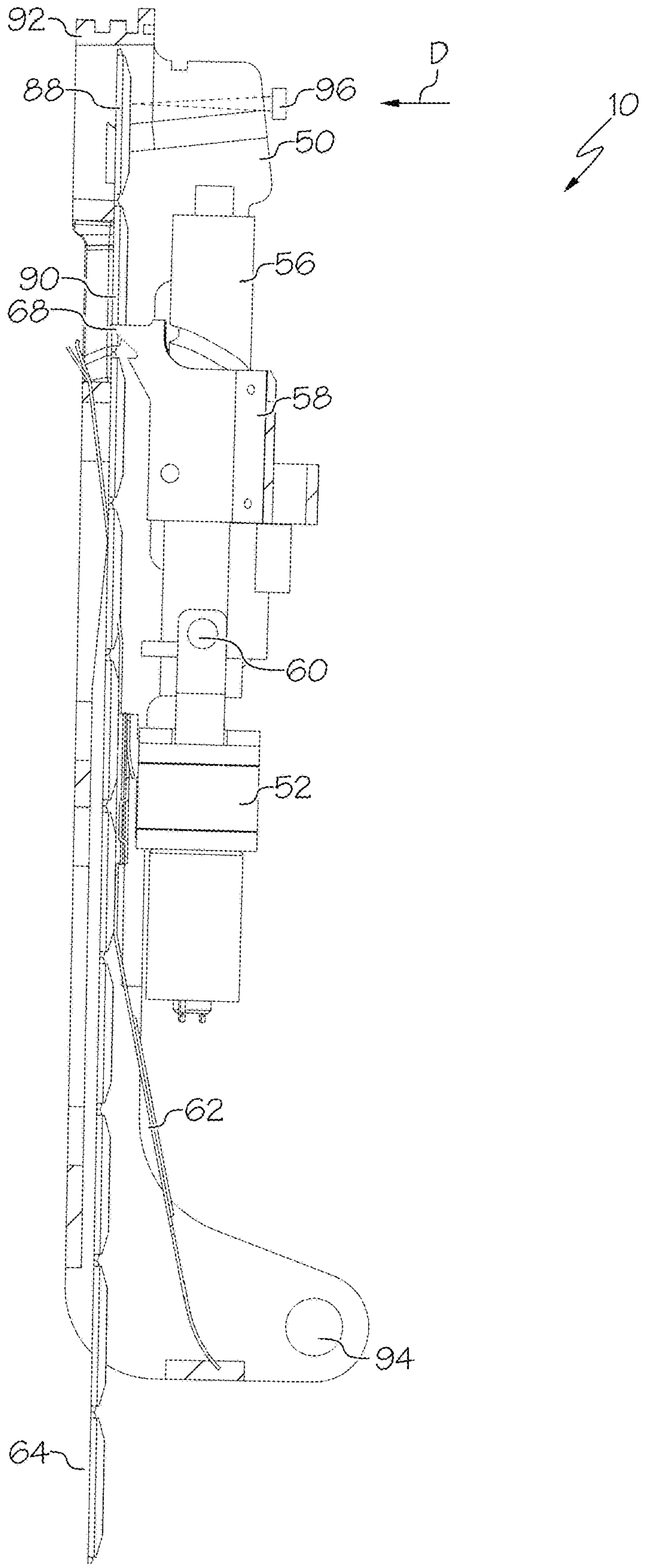
FIG. 4. is a left-side partial cutaway view of a cap feeder sub-assembly of the tool of FIG. 1, in which a single fastener is ready to pierce a cap and adhere both to a surface.

Referring now to FIG. 4, a lead cap 88 is depicted ready to be driven onto a workpiece. A single fastener 96 is shown ready to pierce the lead cap 88, which will subsequently adhere both to a surface. Although not shown in FIG. 4, the single fastener 96 is being forced through the guide body 38, and out of the exit end 26 in a direction D, by the movement of the driver 74. In FIG. 4, the feed pawl 58 is stationary at its closest position to the mounting bracket 54 and the pivot point 60 (sometimes referred to herein as a "proximal position"), and the cap contact portion 68 is holding the lead cap 88 in place. The spring 62 is biasing the feed pawl 58 into contact with the collated strip of caps 64, and the motor 52 is de-actuated. Note that, FIG. 4 depicts the default, or rest position, of the feed pawl 58 and the collated strip of caps 64, and that this rest position for the feed pawl 58 and the collated strip of caps 64 is the same as the driving position discussed above in reference to FIG. 4.

Figure 5:
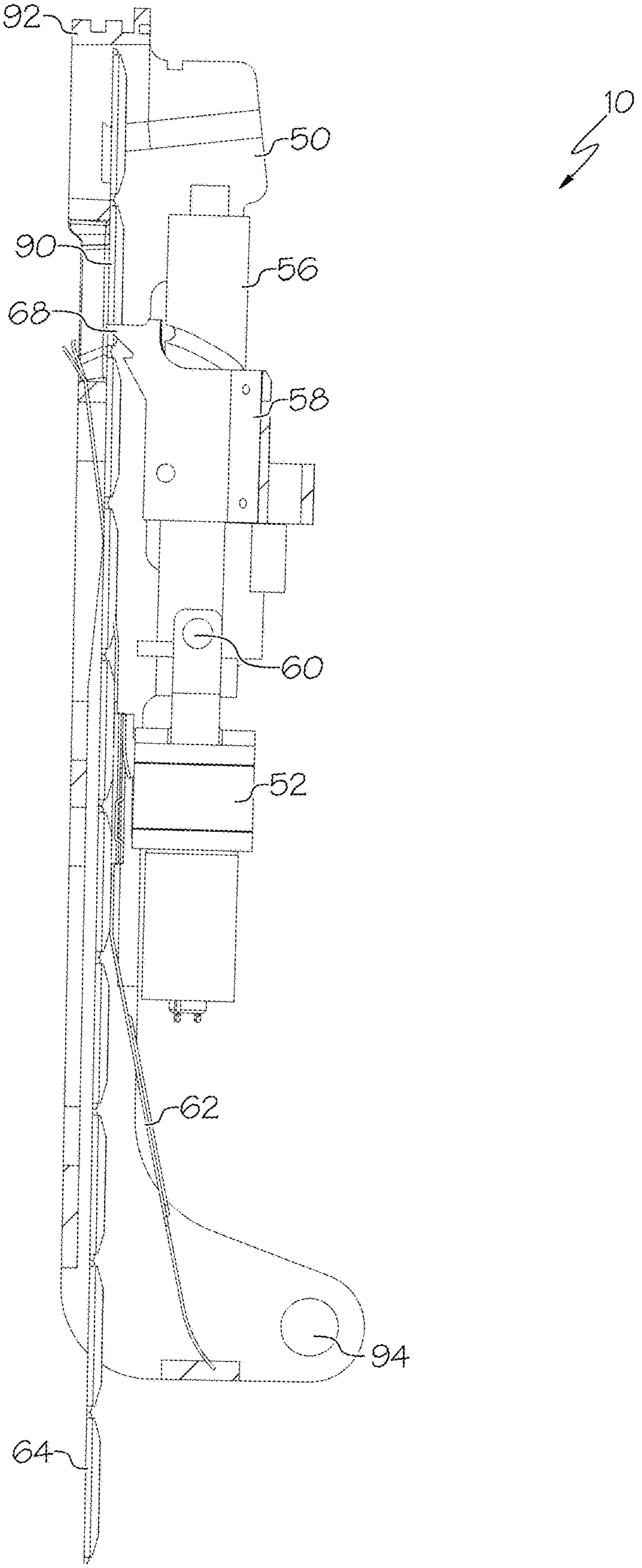
FIG. 5 is a left-side partial cutaway view of the cap feeder sub-assembly of the tool of FIG. 1, illustrating the sub-assembly right after a cap and a fastener have been driven onto a surface.

Referring now to FIG. 5, the driving stroke has completed, and a user is about to move the first end 92 out of contact with a surface. Once that movement occurs, the first motor 52 will energize and start rotating the lead screw 56. The cap contact portion 68 of the feed pawl 58 is in contact with, and ready to feed, the next cap 90.

Figure 6:
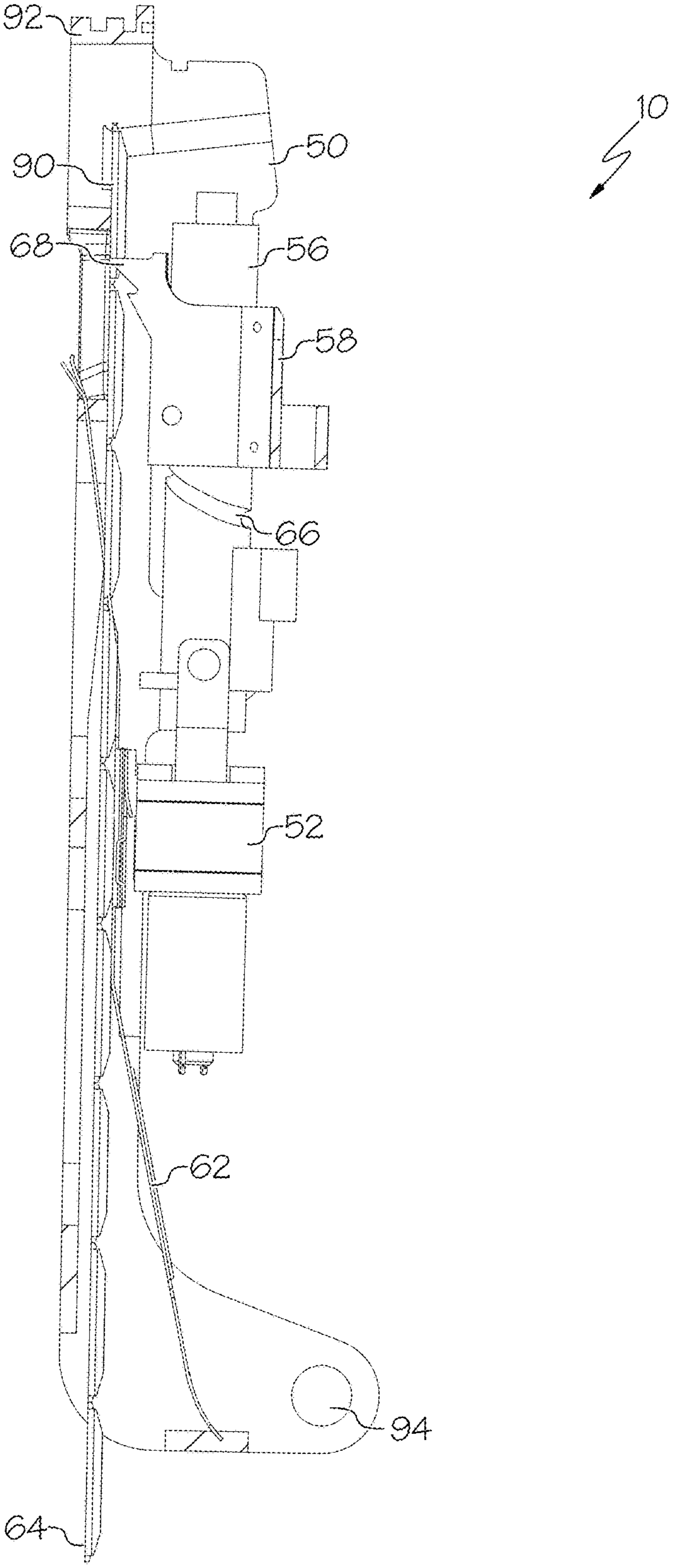
FIG. 6 is a left-side partial cutaway view of the cap feeder sub-assembly of the tool of FIG. 1, in which the feed pawl has begun moving linearly forward and partially advanced the next cap to be fed.

Referring now to FIG. 6, the first motor 52 continues to energize and rotate the lead screw 56, which forces the follower 46 (see FIG. 9) and the feed pawl 58 to start moving linearly "forwards" towards the first end 92. The follower 46 is guided along the grooves 66 on the lead screw 56, which thereby moves the feed pawl 58 towards the first end 92. The movement of the feed pawl 58 forces the cap contact portion 68 to move in the same manner, thereby forcing the next cap 90 to advance, along with the entire collated strip of caps 64.

Figure 7:
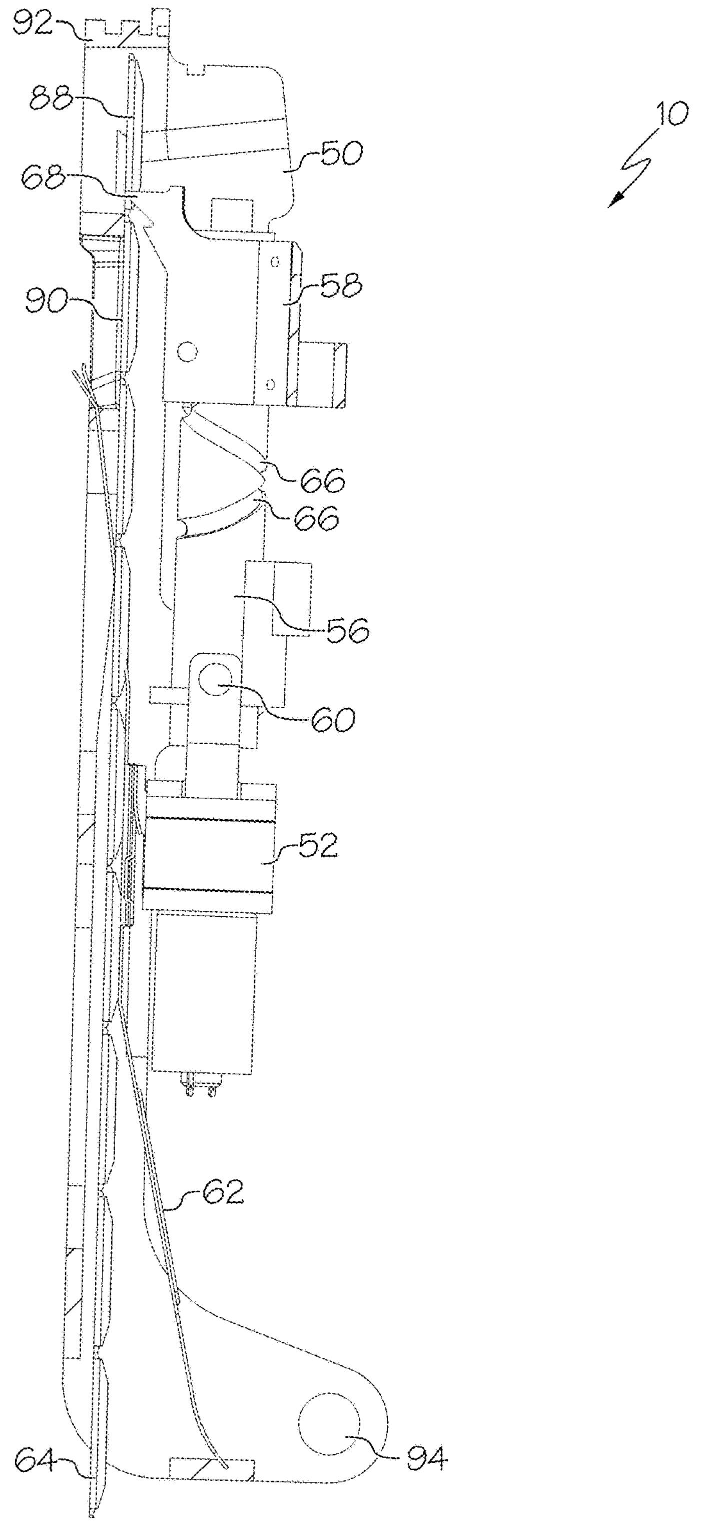
FIG. 7 is a left-side partial cutaway view of the cap feeder sub-assembly of the tool of FIG. 1, in which the feed pawl has fully advanced the next cap.

Referring now to FIG. 7, the feed pawl 58 has moved to its furthest position from the mounting bracket 54 and the pivot point 60 (sometimes referred to herein as a "distal position"), and the next cap 90 has been moved in place for the next driving stroke (and is, in essence, now the lead cap 88). The motor 52 continues to rotate the lead screw 56, which will shortly begin to travel linearly "backwards" and away from the first end 92. The spring 62 acts as a "cap detainer" to hold the caps in place while the feed pawl 58 rides over the top of the caps.

Figure 8:
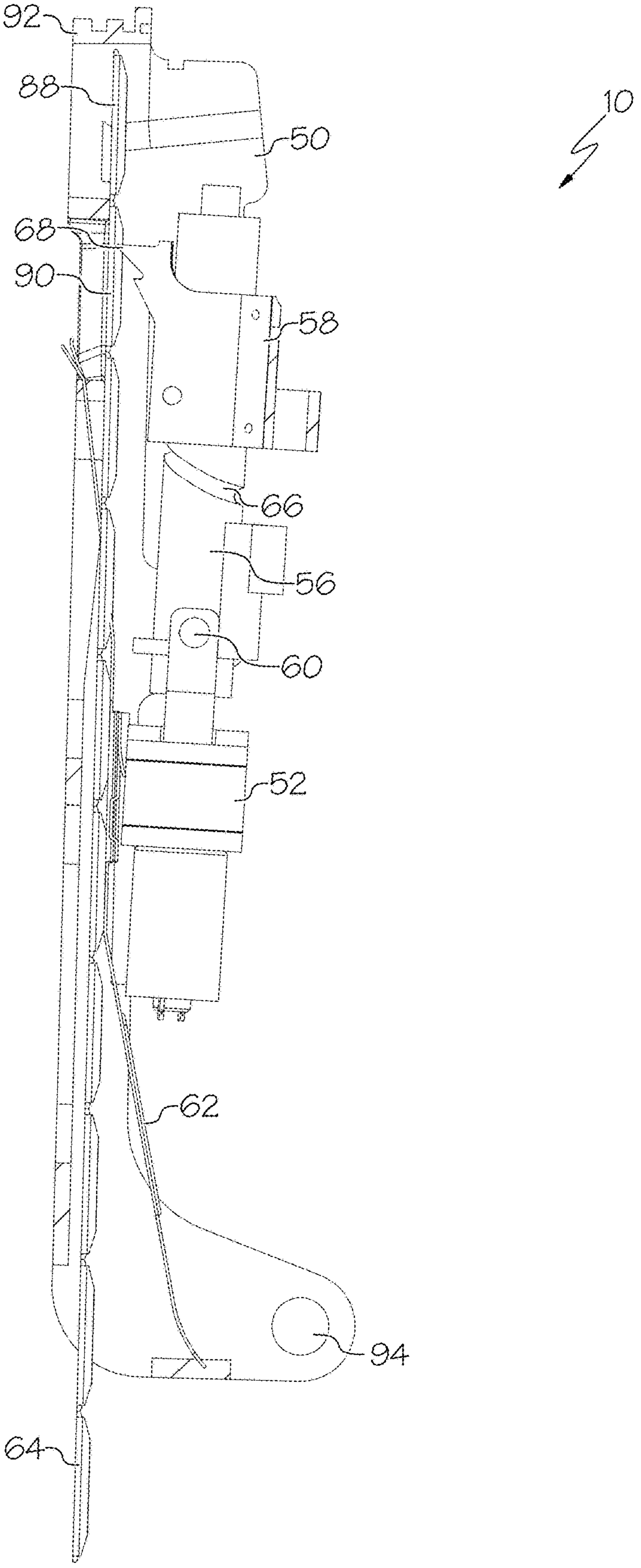
FIG. 8 is a left-side partial cutaway view of the cap feeder sub-assembly of the tool of FIG. 1, in which the feed pawl has started moving linearly backward, on its way to a rest position.

Referring now to FIG. 8, the first motor 52 continues to energize and rotate the lead screw 56 away from the first end 92, and the follower 46 is forced to move due to its contact with the grooves 66 on the lead screw (i.e., the grooves 66 guide the follower 46). This backwards, or reverse, movement by the follower 46 forces the feed pawl 58 and the cap contact portion 68 to slide along and ramp over the next cap 90, which forces the lead screw and the motor to slightly "pivot" at the pivot point 60, thereby slightly compressing the spring 62. The lead screw 56 continues to rotate until the feed pawl 58 returns to its proximal position (i.e., FIG. 5), and the spring 62 continues to act as a cap detainer.

Once this proximal position has been reached, the motor 52 de-actuates and waits for the end of the next driving stroke before the sequence begins anew, and the spring 62 forces the lead screw 56 and the motor 52 to pivot back to their original positions (see FIG. 5). The sequence depicted in FIGS. 4-8 will continue after each driving stroke, feeding one cap at a time as the follower 46 travels linearly forwards and backwards guided by the grooves 66 of the lead screw 56.

Although the sequence illustrated in FIGS. 4-8 is preferred, an alternative sequencing is contemplated. Instead of the feed pawl 58 starting proximal to the mounting bracket 60, the feed pawl 58 would start proximal to the first end 92 (see FIG. 7). In this alternative sequence, after a driving stroke is completed, the feed pawl 58 would linearly travel backwards towards the mounting bracket 60, grab the next cap 90 to be fed, move it forward, and then stop proximal to the first end 92. Either sequence can be implemented in the tool, if desired.

Figure 9:
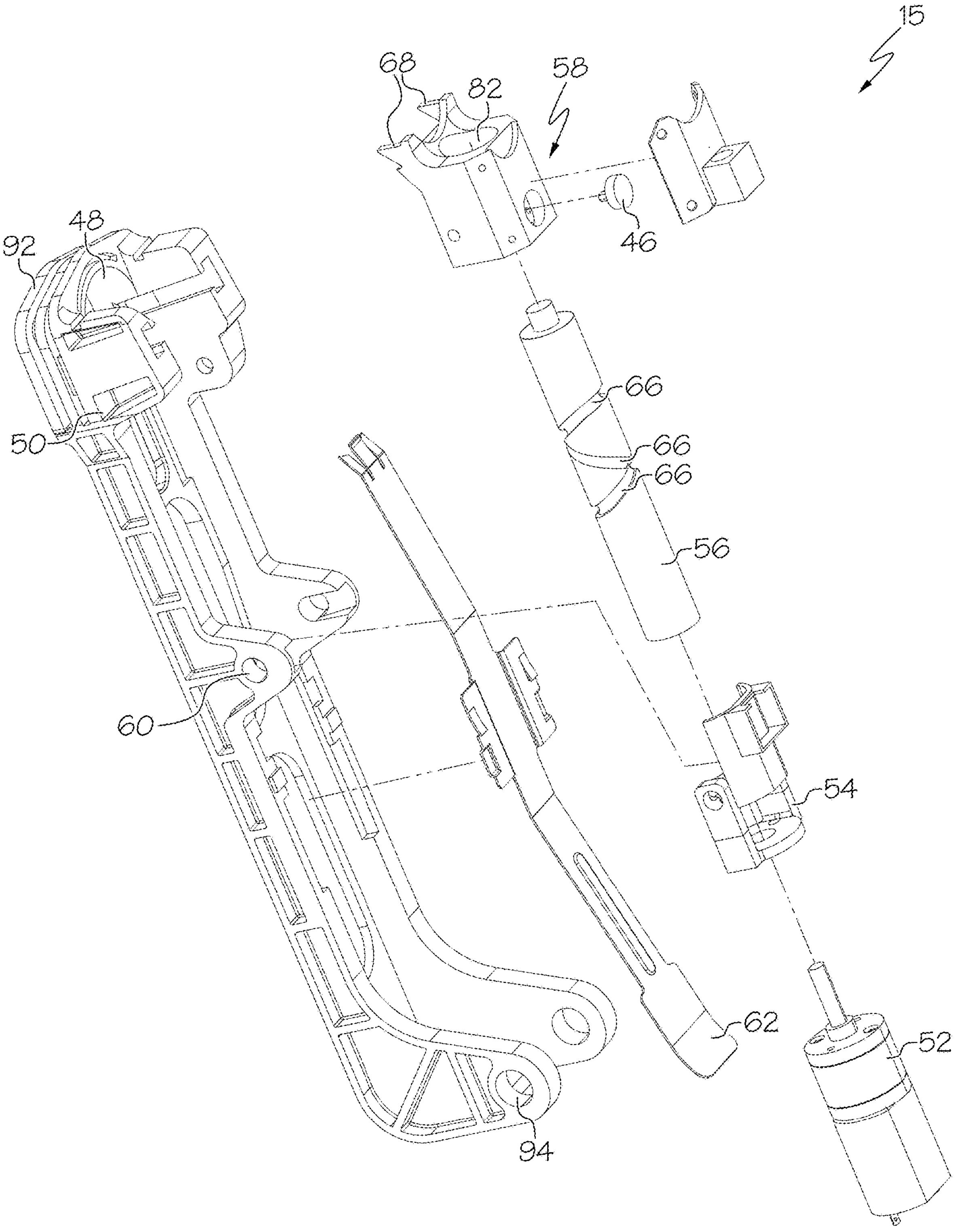
FIG. 9 is an exploded view of the cap feeder sub-assembly, of the tool of FIG. 1.

Referring now to FIG. 9, the follower 46 is depicted along with the feed pawl 58. The lead screw 56 fits through the opening 82 of the feed pawl, and the follower 46 is seated in one of the plurality of grooves 66. The grooves 66 are actually one long single interconnected "groove," but appear to be a plurality of grooves due to how they wind around the outer circumference of the lead screw. This single "groove" allows the follower 46 to continually move back and forth in a linear motion as the lead screw rotates.

The motor 52 and the lead screw 56 are secured on the mounting bracket 54, and the mounting bracket is then attached to the guide 50, on top of the spring 62. The mounting bracket 54 is secured to the guide at the pivot point 60. The lead screw is mounted on a first side of the mounting bracket, whereas the first motor is mounted on a second, opposite side of the mounting bracket, and the lead screw is in mechanical communication with the first motor. In FIG. 9, the cap contact portion 68 is depicted having two separate contact portions, although a single contact portion can be used if desired. Also, a more than two contact portion can be used if desired.

Figure 10:
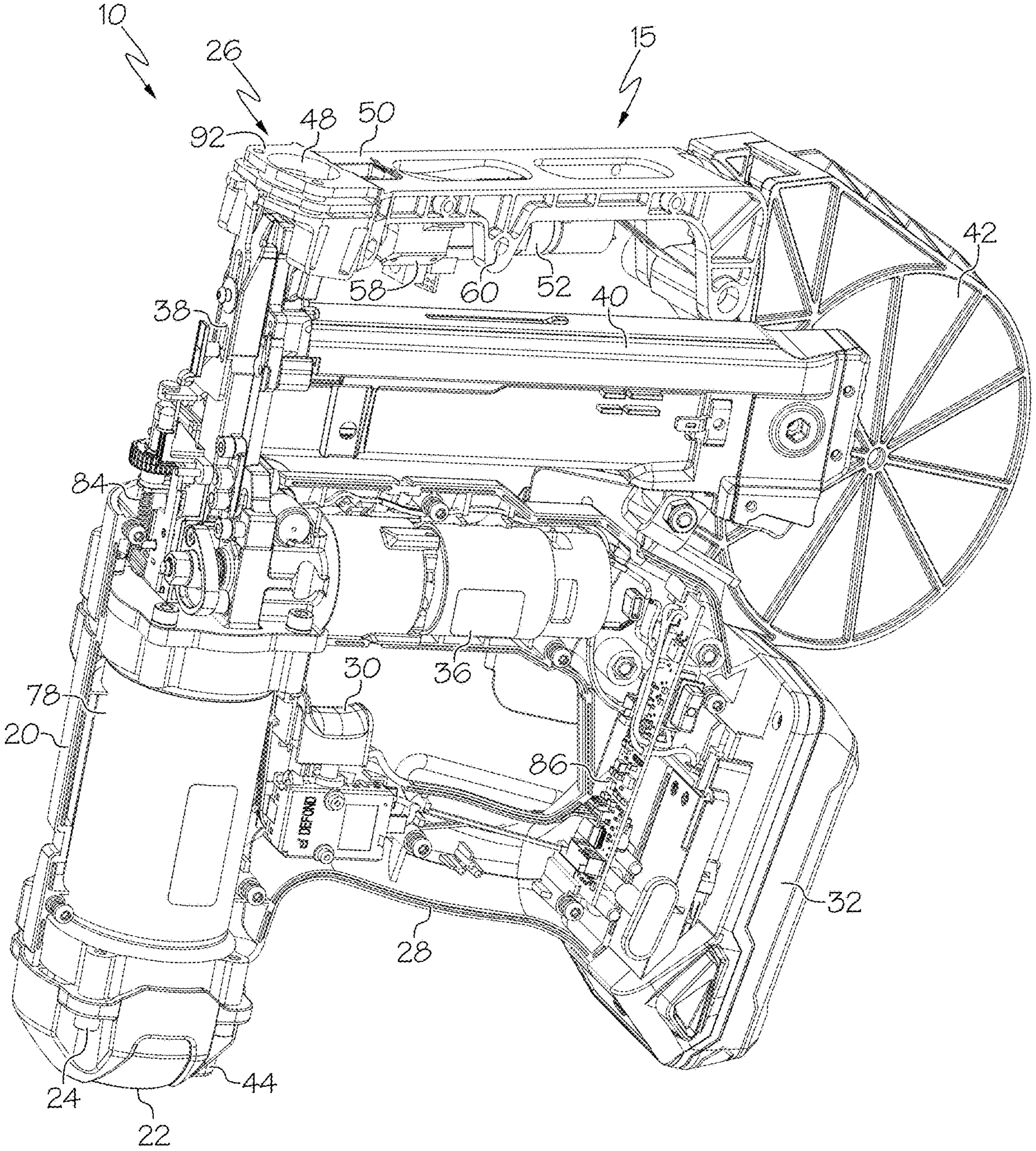
FIG. 10 is a right bottom perspective view of the tool of FIG. 1, with the right-half of the outer housing partially removed for clarity.

Referring now to FIG. 10, the lifter 84 is depicted, along with the controller 86. After a driving stroke, the lifter returns the piston 72 and the driver 74 to the ready position. Once the exit end 26 and the rail 50 are lifted off the workpiece, the cap feeder S/A 15 begins advancing the next cap forward. When the next driving stroke begins, the cap is already in position to be driven onto a workpiece (as shown in FIG. 4, for example).

First Alternative Embodiment

Figure 11:
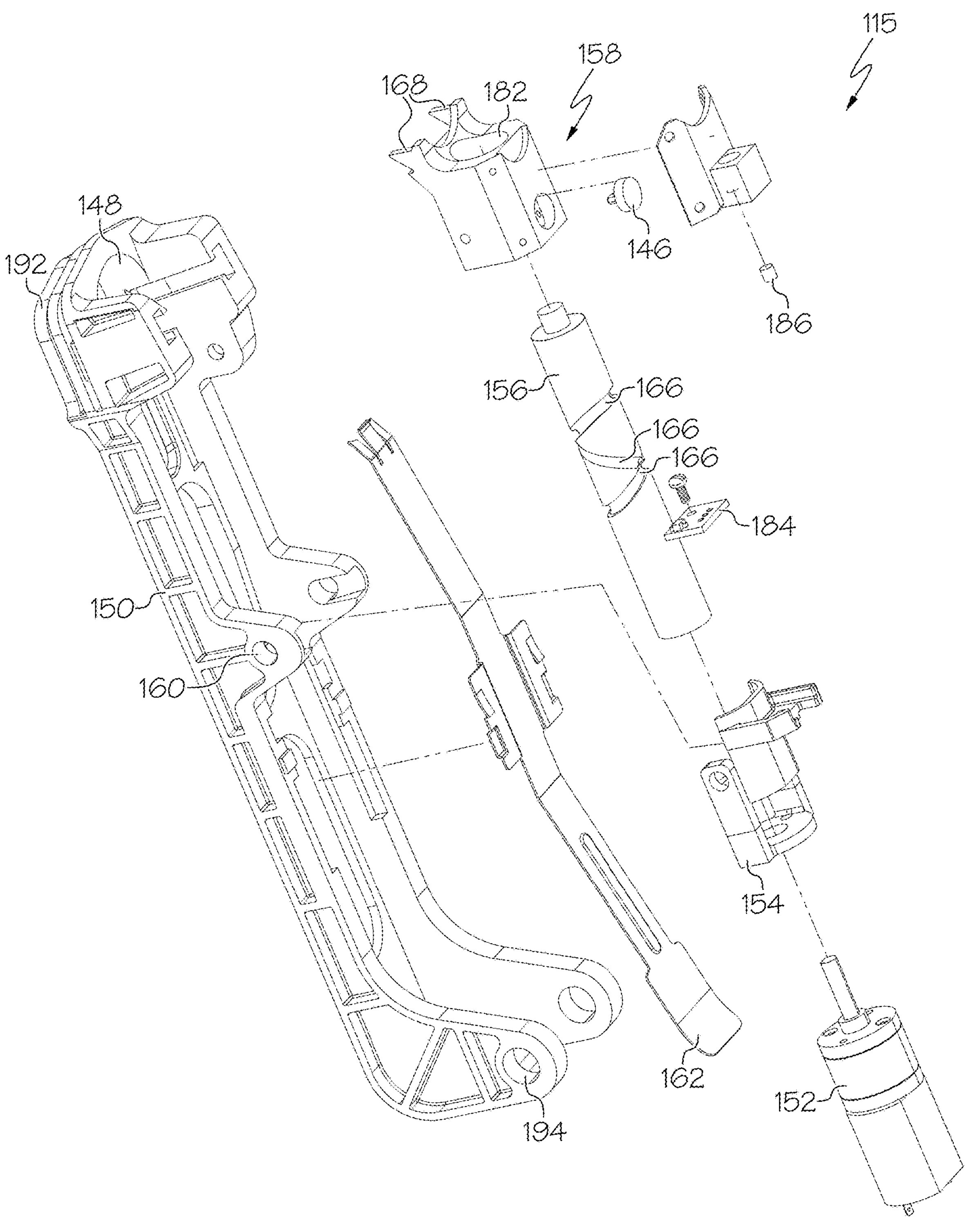
FIG. 11 is an exploded view of a first alternative embodiment of the cap feeder sub-assembly.

Referring now to FIG. 11, a first alternative embodiment of a cap feeder sub-assembly ("S/A") 115 is illustrated. This alternative cap feeder S/A mounts to the tool depicted in FIG. 1, in a similar manner as the first embodiment cap feeder S/A 15. The alternative cap feeder S/A 115 includes a guide 150 (also sometimes referred to as a "rail") with an opening 148, a spring 162 (preferably a leaf spring), and a pivot point 160.

The alternative cap feeder S/A 115 exhibits a safety contact portion 192 (also sometimes referred to herein as a "first end"), which mounts over the exit end 26 of the tool 10. A second end 194 (sometimes referred to herein as a "pivoting point") of the alternative cap feeder S/A 115 is mounted to the cap magazine 42. During a driving stroke, a user presses the front end 192 onto a surface, which forces the alternative cap feeder S/A 115 to pivot at the second end 194, and the alternative cap feeder S/A 115 moves in a direction towards the handle portion 28. When the driving stroke is finished, the user pulls the first end 192 out of contact and away from the surface, and the alternative cap feeder S/A 115 pivots at the second end 194 back towards its original position.

A motor 152 is in mechanical communication with a lead screw 156, and both are secured to a mounting bracket 154, and the mounting bracket is secured to the guide 150 at the pivot point 160. The lead screw 156 exhibits a plurality of grooves 166, although these grooves are actually one long single interconnected "groove," but appear to be a plurality of grooves due to how they wind around the outer circumference of the lead screw. A feed pawl 158 exhibits an opening 182, a cap contact portion 168, a follower 146, and a magnet 186. The lead screw 156 fits through the opening 182 of the feed pawl, and the follower 146 is seated in one of the plurality of grooves 166. The magnet is preferably a permanent magnet.

A sensor 184 is attached to the mounting bracket 154, and is preferably a Hall-effect sensor. The sensor 184 is configured to detect the magnet 186 when the feed pawl 158 is proximal to the mounting bracket. When the sensor detects the magnet, the sensor sends a signal to the controller 86, and the controller determines that a driving stroke has completed (i.e., one cycle). As the feed pawl moves back and forth during operation of the tool, each sensor detection is determined to be one cycle by the controller. The controller 86 keeps a cycle count and can signal the user when certain parts are ready for replacement. For example, the piston stop 76 may typically last 10,000 cycles, and when that cycle count is reached, the controller can illuminate an indicator light that signals the user. Other methods can be used as desired, such as an audible sound, for example.

Although the sensor 184 is illustrated as a non-contact sensor, a contact sensor can be utilized if so desired. The feed pawl 158 could need to be modified so that it physically contacts the sensor in order to trigger a cycle count. Regarding the alternative feed sequence discussed above, the sensor 184 would need to be mounted on the front end 192 in order to correctly track each feed cycle, although this alternative sensor location is not depicted in FIG. 11.

System Controller

Figure 12:
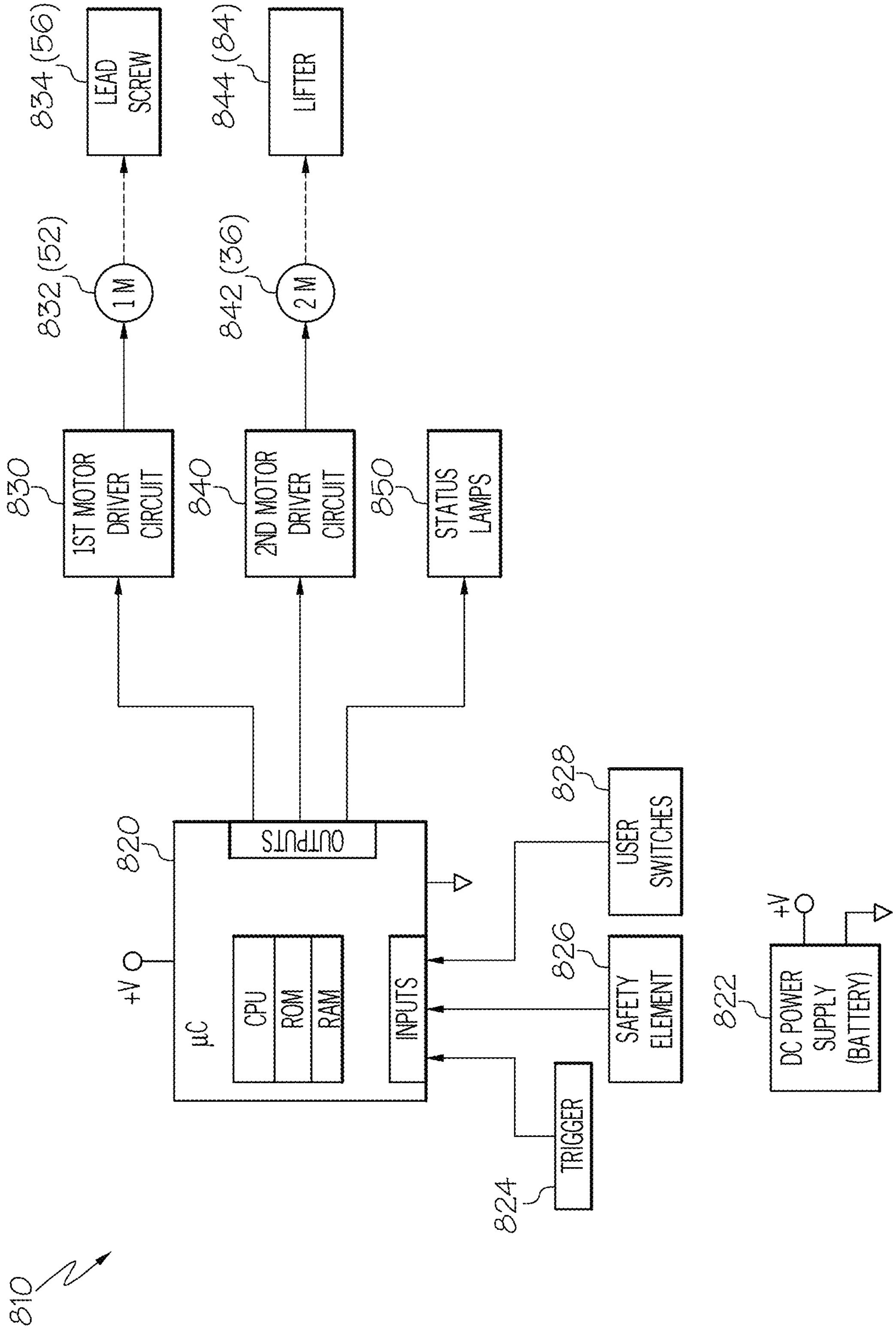
FIG. 12 is a block diagram showing some of the electronic and electrical components of the tool of FIG. 1.

Referring now to FIG. 12, a schematic block diagram of some of the major electrical and electronic components of the driving tool 10 (see FIG. 1) are generally depicted by the reference numeral 810. As with most modern sophisticated products, a system controller is provided to properly control the driving tool 10 so as to operate only when predetermined conditions exist. A microprocessor or microcontroller chip (an integrated circuit) is provided to act as that system controller. In this illustrated embodiment, this chip is a microcontroller, which is generally designated by the reference numeral 820.

All microcontrollers (and microprocessors) include a central processing unit (a "CPU"), which performs the necessary logic and mathematic functions, according to an executable computer program. The executable computer program itself is typically stored in a Read Only Memory chip (a "ROM"), which is on-board the microcontroller chip. If the computer program is so large that it cannot fit in the on-board ROM, then an additional ROM chip may be added to the hardware of this block diagram 810, but that usually is not necessary.

Most (or all) microcontrollers also include on-board Random Access Memory ("RAM"), which is also known as Read/Write Memory, and is used for temporary storage of data or other variable information that needs to be made available to the CPU when executing the computer program stored in the ROM portion of the system's overall memory. If there is insufficient RAM on-board the microcontroller chip, then additional RAM chip(s) may be added—as needed—to the hardware of this block diagram 810. The number and type of memory microcontroller chips will typically be determined by the system designer of the computer program, and of course depends on the size and sophistication of the microcontroller chip itself. It will be understood that there are hundreds, if not thousands, of different types of microcontroller chips available in today's technology, and that the system designer will be required to select a proper chip model, and to correctly write the computer program that is to be used for this system controller.

So far, only the main "computing components" of the microcontroller 820 have been discussed herein. Typical microcontrollers also include other types of on-board circuits as well, such as inputs and outputs. Such inputs and outputs are also typically referred to as "I/O" devices, and they can be interfaced with either analog signals or digital signals, depending on the type of microcontroller chip being used. In the circuit of FIG. 12, the signals that are illustrated are digital signals, even though analog signals will commonly be included in the overall detailed design, particularly to measure the battery's output voltage so as to determine the state of charge of a battery 822. The analog components that are controlled by analog signals, are not depicted on FIG. 12, but it will be understood that such "voltage measuring" circuits will be including in virtually every industrial grade tool that uses a battery as its energy source.

It will be further understood that the above description of a system controller and its major on-board components will be applicable to multiple different types of tools and other computerized devices, and that every modern electrical engineer will have knowledge of how to apply such microprocessor or microcontroller chips, by referring to the user manuals that are always provided by the manufacturers of such chips. However, the computer program (also known as "software") that must be "loaded" into memory of such chips is always a specialized, custom entity in and of itself, and that software is the key to causing a computerized product to work properly.

And note: the ROM type of memory itself is often programmable in today's computerized controller chips. In other words, some ROM is not simply "Read Only"—it may also be partially or wholly erasable, and then re-programmable. Such ROM is thus more precisely described as being EEPROM, which means "Electrically Erasable Programmable Read Only Memory." Memory elements in an EEPROM chip are thus "writable" to some extent. In other words, such memory elements are not strictly "read only" memory elements, because they can be erased and then re-written to, under controlled conditions of that EEPROM chip. In fact, this is typical in many of the modern electronic devices available today.

Inputs

In the circuit 810, a trigger 824, a safety element 826, and one or more user-actuated switches 828 are all depicted as being connected to the "Inputs" terminals (or "pinouts") of the microcontroller chip 820. The trigger 824 is illustrated at 30 on FIG. 1, and is user-actuated. The safety element 826 is illustrated at 92 on FIG. 1, and is actuated if the front end (or "first end") of the tool 10 is pressed with sufficient force against a target substrate, such as a piece of wood or metal. In most nailer tools, for example, both the trigger 824 and the safety element 826 must be actuated to cause the tool to "drive" a fastener.

The user switches 828 can be virtually anything a system designer wishes to include in a fastener driving tool. Many such tools include small pushbutton-type switches to actuate a particular function, such as looking at the battery charge status. Other functions are sometimes also made available, such as a "bottom fire" mode, or a "sequential fire" mode, and such user switches at 828 can be actuated by a user for that selection.

Another rather unique function for plastic-cap tools only would be a function that allows the tool's user to select the overall mode of operation of the tool either (a) to drive only a fastener, or (b) to drive both a fastener and a plastic cap at the same time (i.e., in the same single operation of the tool). Although the tool 10 of this overall design is specifically designed to drive both a plastic cap and a fastener in a single operation, there may be situations in which the tool's operator (the "user") may wish to use this tool only as a "nailer" or a "stapler", i.e., without the plastic cap also being dispensed. A "disable cap feeder switch" (or "Disable Switch")—i.e., one of the "User Switches" 828—would allow that selection to occur. When the Disable Switch has been selected so as to be active, then the tool 10 will operate to drive a fastener only, without a plastic cap. Of course, the opposite mode may also be selected, so as to command the tool 10 to operate in its typical mode, which will drive both a fastener and a plastic cap in the same drive stroke.

Other types of user switches 828 may also be provided, of course. The uses of such "input" switches are really limited only by the system designer's imagination.

Outputs

In the circuit 810, a first motor driver circuit 830, a second motor driver circuit 840, and one or more status lamps 850 are all depicted as being connected to the "Outputs" terminals (or "pinouts") of the microcontroller chip 820. The status lamps 850 typically are LEDs, which may indicate what mode of operation the tool presently is in. For example, one of the lamps 850 could be illuminated or off, depending if the tool is in a "bottom fire" mode, or a "sequential fire" mode, if those two modes are both implemented in this tool 10. Or, as another more typical example, one of the lamps 850 could be illuminated or off, depending if the tool is in a "Disable Cap Feeder" ON-mode, or the opposite mode. Furthermore, the status lamps 850 could have different colors, and could indicate the status of the present battery charge, in which green color LEDs could illuminate to indicate a near-full charge, for example, which red color LEDs could illuminate to indicate a near-depleted charge, for example.

The first motor driver circuit 830 is provided to supply a proper voltage and current to a first motor 832, which is the same device as the first motor 52 on FIG. 1, and which is also designated as "1M" on FIG. 12. This circuit 830 is controlled by an output signal that originates from the microcontroller 820, in which that output signal, by itself, cannot supply a sufficient current or voltage to directly drive the first motor 832, 52.

The second motor driver circuit 840 is provided to supply a proper voltage and current to a second motor 842, which is the same device as the second motor 36 on FIG. 1, and which is also designated as "2M" on FIG. 12. This circuit 840 is controlled by an output signal that originates from the microcontroller 820, in which that output signal, by itself, cannot supply a sufficient current or voltage to directly drive the second motor 842, 36.

Interface to Mechanical Components

The first motor 832, 52 is used to drive the motion of the lead screw 56 (see FIG. 1), which is also referred to by the reference numeral 834 on FIG. 12. Similarly, the second motor 842, 36 is used to drive the motion of the lifter 84 (see FIG. 10), which is also referred to by the reference numeral 844 on FIG. 12.

As one might expect, the second motor 2M (or 842, 36) is used on every drive stroke, regardless as to the present mode of the "Disable Switch" 828, because the lifter 844 must be activated after every drive stroke, whether a plastic cap was driven or not in the previous drive stroke. However, the first motor 1M (or 832, 52) is used only if the present drive stroke is intended to drive a fastener through a plastic cap which, after all, is the main function of this tool 10.

Note that some of the embodiments illustrated herein do not have all of their components included on some of the figures herein, for purposes of clarity. To see examples of such outer housings and other components, especially for earlier designs, the reader is directed to other U.S. patents and applications owned by Kyocera Senco. Similarly, information about "how" the electronic controller operates to control the functions of the tool is found in other U.S. patents and applications owned by Kyocera Senco. Moreover, other aspects of the present tool technology may have been present in earlier fastener driving tools sold by the Assignee, Kyocera Senco Industrial Tools, Inc., including information disclosed in previous U.S. patents and published applications. Examples of such publications are patent numbers U.S. Pat. Nos. 6,431,425; 5,927,585; 5,918,788; 5,732,870; 4,986,164; 4,679,719; 8,011,547, 8,267,296, 8,267,297, 8,011,441, 8,387,718, 8,286,722, 8,230,941, 8,602,282, 9,676,088, 10,478,954, 9,993,913, 10,549,412, 10,898,994, 10,821,585, 8,763,874, 11,491,624, 11,731,254, 11,185,971, and 11,413,734; and published application No. U.S. 2021/0237242, published application No. U.S. 2021/0347023, published application No. U.S. 2023/0264331, and published application No. U.S. 2022/0355460. These documents are incorporated by reference herein, in their entirety.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two (male and female) structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two (male and female) structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A fastener cap driving tool, comprising:

an outer housing;

a working cylinder that includes a movable piston therewithin, and a driver in mechanical communication with the movable piston;

a storage chamber that is in fluidic communication with the working cylinder, the storage chamber being charged with a pressurized gas, and the pressurized gas causing the movable piston and the driver to move through a driving stroke toward a driven position, wherein the pressurized gas is not vented to atmosphere after the driving stroke, but instead the pressurized gas is re-used for a plurality of operating cycles;

a first magazine for feeding a collated strip of fasteners;

a second, separate magazine for feeding a collated strip of caps;

a removably attachable battery; and a cap feeder sub-assembly, comprising:

a self-reversing lead screw;

a feed pawl configured to be driven by the self-reversing lead screw; and a first motor in mechanical communication with the self-reversing lead screw; and wherein when the driving stroke occurs, one fastener from the collated strip of fasteners pierces one cap from the collated strip of caps, thereby adhering one fastener and one cap to a surface.

2. The tool of claim 1, further comprising:

a guide body that includes a driver track and an exit end, where a fastener is to be driven; and a handle portion including a trigger.

3. The tool of claim 2, further comprising:

a second motor in mechanical communication with a lifter; and the lifter is configured to move the driver and the movable piston toward a ready position.

4. The tool of claim 1, wherein:

the cap feeder sub-assembly further comprises:

a guide exhibiting a pivot point and an opening;

a spring; and a mounting bracket;

the first motor is attached to a first side of the mounting bracket, and the self-reversing lead-screw is attached to an opposite second side of the mounting bracket;

the mounting bracket is attached to the guide proximal to the pivot point; and the spring biases the feed pawl into engagement with the collated strip of caps.

5. The tool of claim 4, wherein:

the feed pawl exhibits a contact portion that contacts the collated strip of caps.

6. The tool of claim 5, wherein:

the self-reversing lead screw exhibits a plurality of grooves, and the plurality of grooves are interconnected along an outer circumference of the self-reversing lead screw;

the feed pawl includes a follower, and the follower seats in the plurality of grooves; and the feed pawl mounts onto the self-reversing lead screw, and the follower travels along the interconnected plurality of grooves as the self-reversing lead screw rotates, which guides the feed pawl to travel linearly backward and forward.

7. The tool of claim 6, wherein:

when the feed pawl is travelling forward along the self-reversing lead screw, the feed pawl is moving away from the mounting bracket and the spring is biasing the contact portion into contact with a lead cap on the collated strip of caps, as the feed pawl feeds the lead cap into the opening of the guide, the lead cap will be pierced by the fastener and adhered to a surface during the driving stroke;

when the feed pawl is travelling backward along the self-reversing lead screw, the feed pawl is moving towards the mounting bracket and the contact portion ramps up and over a next cap to be fed, which forces the self-reversing lead screw, the first motor, and the mounting bracket to pivot away from the collated strip of caps and overcoming the biasing force of the spring; and when the feed pawl is proximal to the mounting bracket, the contact portion slides down into contact with the next cap to be fed on the collated strip of caps and the spring biases the self-reversing lead screw, the first motor, and the mounting bracket back towards the collated strip of caps.

8. The tool of claim 7, wherein:

the cap feeder sub-assembly attaches to both an exit end of the tool, and the second magazine.

9. A cap feeder for a fastener cap driving tool, the cap feeder comprising:
a self-reversing lead screw;
a feed pawl configured to be driven by the self-reversing lead screw;
a first motor in mechanical communication with the self-reversing lead screw;
a guide exhibiting a pivot point and an opening;
a spring;
a mounting bracket;
the first motor is attached to a first side of the mounting bracket, and the self-reversing lead-screw is attached to an opposite second side of the mounting bracket;
the mounting bracket is attached to the guide proximal to the pivot point; and
the spring biases the feed pawl into engagement with a collated strip of caps.

10. The cap feeder of claim 9, wherein:
the tool comprises:
an outer housing;
a working cylinder that includes a movable piston therewithin, and a driver in mechanical communication with the movable piston;
a handle portion including a trigger;
a storage chamber that is in fluidic communication with the working cylinder, the storage chamber being charged with a pressurized gas, and the pressurized gas causing the movable piston and the driver to move through a driving stroke toward a driven position, wherein the pressurized gas is not vented to atmosphere after the driving stroke, but instead the pressurized gas is re-used for a plurality of operating cycles;
a first magazine for feeding a collated strip of fasteners;
a second, separate magazine for feeding a collated strip of caps; and
when a driving stroke occurs, one fastener from the collated strip of fasteners pierces one cap from the collated strip of caps, thereby adhering one fastener and one cap to a surface.

11. The cap feeder of claim 10, wherein:
the tool exhibits a guide body that includes a driver track and an exit end, where a fastener is to be driven; and
the cap feeder attaches to both the exit end of the tool, and the second magazine.

12. The cap feeder of claim 11, wherein:
the tool includes a second motor in mechanical communication with a lifter; and
the lifter is configured to move the driver and the movable piston toward a ready position.

13. The cap feeder of claim 11, wherein:
the feed pawl exhibits a contact portion that contacts the collated strip of caps.

14. The cap feeder of claim 13, wherein:
the self-reversing lead screw exhibits a plurality of grooves, and the plurality of grooves are interconnected along an outer circumference of the self-reversing lead screw;
the feed pawl includes a follower, and the follower seats in the plurality of grooves; and
the feed pawl mounts onto the self-reversing lead screw, and the follower travels along the interconnected plurality of grooves as the self-reversing lead screw rotates, which guides the feed pawl to travel linearly backward and forward.

15. A fastener cap driving tool, comprising:
an outer housing;
a controller;
a working cylinder that includes a movable piston therewithin, and a driver in mechanical communication with the movable piston;
a handle portion including a trigger;
a storage chamber that is in fluidic communication with the working cylinder, the storage chamber being charged with a pressurized gas, and the pressurized gas causing the movable piston and the driver to move through a driving stroke toward a driven position, wherein the pressurized gas is not vented to atmosphere after the driving stroke, but instead the pressurized gas is re-used for a plurality of operating cycles;
a first magazine for feeding a collated strip of fasteners;
a second, separate magazine for feeding a collated strip of caps;
a removably attachable battery; and
a cap feeder sub-assembly, comprising:
a self-reversing lead screw;
a feed pawl configured to be driven by the self-reversing lead screw;
a first motor in mechanical communication with the self-reversing lead screw;
a mounting bracket including a sensor; and
wherein when the driving stroke occurs, one fastener from the collated strip of fasteners pierces one cap from the collated strip of caps, thereby adhering one fastener and one cap to a surface.

16. The tool of claim 15, wherein:
the cap feeder sub-assembly further comprises:
a guide exhibiting a pivot point and an opening; and
a spring;
the first motor is attached to the mounting bracket, and the self-reversing lead-screw is attached to an opposite side of the mounting bracket;
the mounting bracket is attached to the guide proximal to the pivot point; and
the spring biases the feed pawl into engagement with a collated strip of caps.

17. The tool of claim 16, wherein:
the self-reversing lead screw exhibits a plurality of grooves, and the plurality of grooves are interconnected along an outer circumference of the self-reversing lead screw;
the feed pawl includes a follower, and the follower seats in the plurality of grooves; and
the feed pawl mounts onto the self-reversing lead screw, and the follower travels along the interconnected plurality of grooves as the self-reversing lead screw rotates, which guides the feed pawl to travel linearly backward and forward.

18. The tool of claim 17, wherein:
the sensor is configured to detect when the feed pawl is proximal to the mounting bracket; and
the sensor will send a signal to the controller when the feed pawl is detected.

19. The tool of claim 18, further comprising:
the feed pawl includes a permanent magnet; and
the sensor is a Hall-effect sensor.

20. The tool of claim 18, wherein:
the sensor comprises one of:
a non-contact sensor; or
a contact sensor.

21. The tool of claim 15, further comprising:

a second motor in mechanical communication with a lifter; and the lifter is configured to move the driver and the movable piston toward a ready position.

22. A method for driving a fastener and a cap onto a surface, the method comprising:

providing a fastener cap driving tool that includes:

an outer housing;

a working cylinder that includes a movable piston therewithin, and a driver in mechanical communication with the movable piston;

a storage chamber that is in fluidic communication with the working cylinder, the storage chamber being charged with a pressurized gas, and the pressurized gas causing the movable piston and the driver to move through a driving stroke toward a driven position, wherein the pressurized gas is not vented to atmosphere after the driving stroke, but instead the pressurized gas is re-used for a plurality of operating cycles;

a first magazine for feeding a collated strip of fasteners;

a second, separate magazine for feeding a collated strip of caps;

a removably attachable battery; and a cap feeder sub-assembly, comprising:

a self-reversing lead screw;

a feed pawl configured to be driven by the self-reversing lead screw; and a first motor in mechanical communication with the self-reversing lead screw; and initiating the driving stroke, wherein one fastener from the collated strip of fasteners pierces one cap from the collated cap of strips, thereby adhering one fastener and one cap to a surface.

23. The method of claim 22, further comprising:

a guide body that includes a driver track and an exit end, where a fastener is to be driven; and a handle portion including a trigger.

24. The method of claim 23, further comprising:

a second motor in mechanical communication with a lifter; and the lifter is configured to move the driver and the movable piston toward a ready position.

25. The method of claim 22, wherein:

the cap feeder sub-assembly further comprises:

a guide exhibiting a pivot point and an opening;

a spring; and a mounting bracket;

the first motor is attached to a first side of the mounting bracket, and the self-reversing lead-screw is attached to an opposite second side of the mounting bracket;

the mounting bracket is attached to the guide proximal to the pivot point; and the spring biases the feed pawl into engagement with the collated strip of caps.

26. The method of claim 25, wherein:

the self-reversing lead screw exhibits a plurality of grooves, and the plurality of grooves are interconnected along an outer circumference of the self-reversing lead screw;

the feed pawl includes a follower, and the follower seats in the plurality of grooves; and the feed pawl mounts onto the self-reversing lead screw, and the follower travels along the interconnected plurality of grooves as the self-reversing lead screw rotates, which guides the feed pawl to travel linearly backward and forward.

27. The method of claim 25, wherein:

a first end of the cap feeder sub-assembly exhibits the opening and mounts onto an exit end of the tool;

a second, opposite end of the cap feeder sub-assembly is pivotally mounted onto the second magazine;

at a start of the driving stroke, the first end is pressed onto a surface, thereby pivoting the cap feeder sub-assembly in a direction towards the handle portion of the tool; and at an end of the driving stroke, the first end is released from contact with the surface, wherein the cap feeder sub-assembly pivots in an opposite direction towards the cap feeder sub-assembly's original position.

* * * * *